(12) United States Patent
Campos et al.

(10) Patent No.: US 7,298,586 B1
(45) Date of Patent: Nov. 20, 2007

(54) THIN-FILM READ ELEMENT WITH MULTIPLE READ SENSORS

(75) Inventors: Francis Campos, Louisville, CO (US); Larry E. Daby, Erie, CO (US); Hubert Hayworth, Fort Lupton, CO (US)

(73) Assignee: Storage Technology Corporation, Louisville, CO (US)

( * ) Notice: Subject to any disclaimer, the term of this patent is extended or adjusted under 35 U.S.C. 154(b) by 463 days.

(21) Appl. No.: 10/935,048

(22) Filed: Sep. 7, 2004

(51) Int. Cl.
*G11B 5/127* (2006.01)
*G11B 5/23* (2006.01)
*G11B 5/147* (2006.01)

(52) U.S. Cl. .................................. 360/125; 29/603.14
(58) Field of Classification Search ................ 360/125; 29/603.14
See application file for complete search history.

(56) References Cited

U.S. PATENT DOCUMENTS

| 5,315,469 | A | * | 5/1994 | McNeil ...................... 360/119 |
| 5,855,056 | A | * | 1/1999 | Cates ...................... 29/603.14 |
| 6,172,857 | B1 | | 1/2001 | Inaguma et al. |
| 6,304,414 | B1 | | 10/2001 | Crue, Jr. et al. |
| 6,477,009 | B1 | * | 11/2002 | Watson et al. .............. 360/128 |
| 6,512,651 | B1 | | 1/2003 | Eifert et al. |
| 6,683,760 | B1 | | 1/2004 | Kikuiri |
| 6,731,474 | B2 | | 5/2004 | Terunuma et al. |

* cited by examiner

*Primary Examiner*—Angel Castro
*Assistant Examiner*—Christopher R. Magee
(74) *Attorney, Agent, or Firm*—Brooks Kushman P.C.

(57) ABSTRACT

The present invention relates to a thin-film read element for use in reading magnetic signals from a device. The read element includes a first thin-film read sensor and a second thin-film read sensor that are each configured to convert the magnetic signals of the device to electrical signals.

13 Claims, 3 Drawing Sheets

THIN-FILM READ ELEMENT WITH MULTIPLE READ SENSORS

BACKGROUND OF THE INVENTION

1. Field of the Invention

The present invention relates to thin-film read elements used to read magnetic information by converting magnetic signals to electrical signals.

2. Background Art

In tape and disc recording systems, multiple read elements on multiple chips can be used to improve track locating and following. This necessitates precise control of the placement of the read elements in both X and Y coordinates relative to a written track. The larger the Y offset becomes, the more difficult it is to achieve the necessary X offset. This problem is made worse by the use of multiple chips because the positioning of the multiple chips is limited to the mechanical precision of the devices used to position the chips.

SUMMARY OF THE INVENTION

One aspect of the present invention relates to a thin-film read element for use in reading magnetic signals from a device. The read element includes a first thin-film read sensor and a second thin-film read sensor that are each configured to convert the magnetic signals of the device to electrical signals. The read sensors are preferably formed on a single chip structure to enhance alignment between the first read sensor and the second read sensor.

In one aspect of the present invention, the read element can include a shared shield between the first and second read sensor that defines at least a portion of a first window for the first read sensor and at least a portion of a second window of the second read sensor, whereby the read sensors receive the magnetic signals through the windows.

In one aspect of the present invention, the read element can include a first and second shield on opposite sides of the first read sensor and a third and fourth shield on opposite sides of the second read sensor. The first and second shields defining a portion of a first window of the first read sensor and the third and fourth shield defining a portion of a second window of the second read sensor, whereby the read sensors receive the magnetic signals through the windows. Preferably, a planarization layer is formed between the second shield and the third shield. The planarization layer providing a level surface for maximizing alignment positioning of the second read sensor relative to the first read sensor.

One aspect of the present invention relates to a method for manufacturing a thin-film read element for use in reading magnetic signals from a device. The method includes forming a first layer of ceramic material; forming a first portion of an insulating layer on the first layer; positioning a first shield on the first portion of the insulating layer; forming a second portion of the insulating layer on the first shield; positioning a first thin-film read sensor on the second portion of the insulating layer, the first read sensor converting the magnetic signals to electrical signals; forming a third portion of the insulating layer on the first thin-film read sensor; positioning a shared-shield on the third portion of the insulating layer; forming a fourth portion of the insulating layer on the shared-shield; positioning a second read sensor on the fourth portion of the insulating layer, the second read sensor converting the magnetic signals to electrical signals; forming a fifth portion of the insulating layer on the second read sensor; positioning a second shield on the fifth portion of the insulating layer; forming a sixth portion of the insulating layer on the second shield; and forming a second layer of ceramic material on the sixth portion of the insulating layer.

It is an advantage of the present invention that an accumulation of tolerances during read element fabrication is reduced by eliminating an alumina spacer layer between the multiple read sensors.

It is an advantage of the present invention that the total number of process steps in read element fabrication is reduced by limiting a number of planarization steps between read sensor placements.

It is an advantage of the present invention that separation between read elements is reduced.

It is an advantage of the present invention that the number of shield deposition and process steps are reduced.

It is an advantage of the present invention that a number of chemical mechanical polished (CMP) steps are reduced.

DETAILED DESCRIPTION OF THE PREFERRED EMBODIMENT(S)

Figure 1:
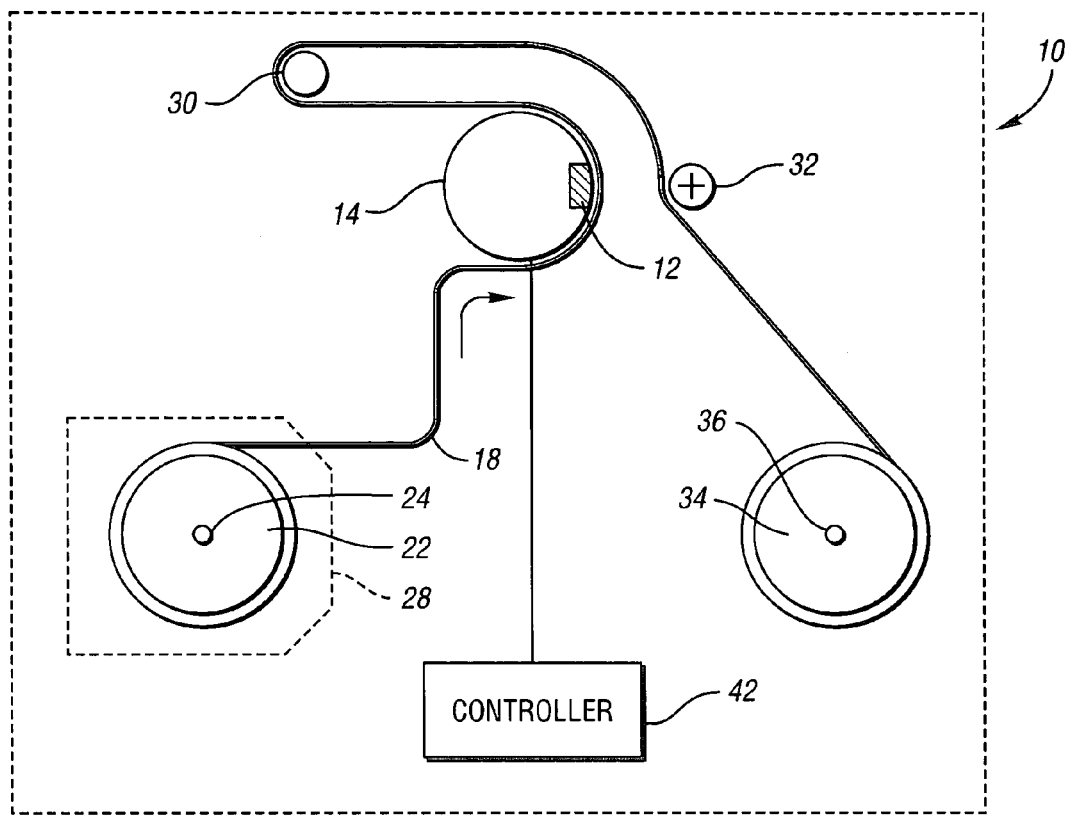
FIG. 1 illustrates a diagram of a helical scan tape drive having a read element on a tape head in accordance with one aspect of the present invention.

FIG. 1 illustrates a diagram of a helical scan tape drive 10 having a read element 12 on a tape head 14 in accordance with one aspect of the present invention. The read element 12 includes features for reading data bits from a magnetic tape 18. The tape 18 is wound on a reel 22 that rotates around a spindle 24 within a magnetic tape cartridge 28. The tape 18 proceeds around the tape head 14, around a guide 30, over a capstan 32, and is wound on a reel 34 that rotates around spindle 36. A controller 42 controls operation of the drive 10, including positioning of the tape head 14 and movement of the tape 18.

FIG. 1 illustrates one exemplary application of the read element 12 as it generally applies to tape drives and tape drive systems. As will be apparent from the description provided below, the read element 12 of present invention is suitable for use in other environments and in other applications beyond tape drives. In particular, the present invention contemplates that the read element 12 may be included in a disc drive for reading data from a magnetic disc.

Figure 2:
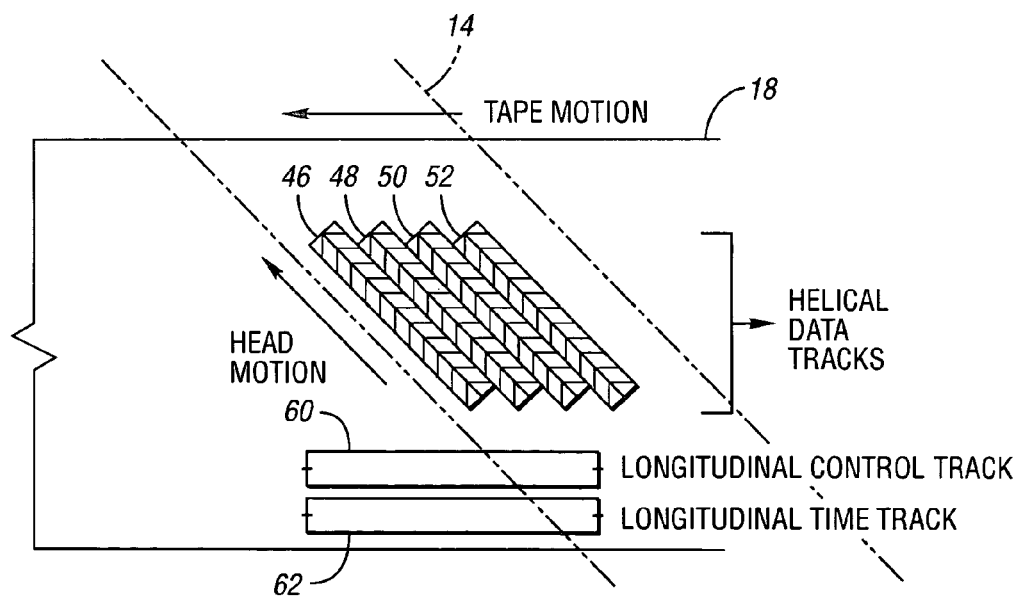
FIG. 2 illustrates a diagram of a data recording format of the tape in accordance with one aspect of the present invention.

FIG. 2 is a diagram of a helical data recording format of the tape 18 in accordance with one aspect of the present invention. The tape head 14 is shown in phantom to illustrate its position relative to the tape 18 as it selectively rotates at an azimuth angle relative to the tape to control the exposure of the read element to the tape 18 as the tape 18 is feed past the tape head 14. The azimuth angle of the tape head 14 preferably matches an azimuth angle of pairs of data tracks 46-52, such as with an azimuth angle of +−20°.

The magnetic tape 18 also preferably includes a longitudinal servo control track 60 and longitudinal time code track 62. Servo control track 60 is recorded as the helical tracks are written onto the magnetic tape. One use of the servo control track is to synchronize the rotation of the tape head 14 with the position of the helical tracks 46-52 on the magnetic tape 18 during playback. The time code track 62 contains location information that uniquely identifies groups of helical tracks.

Figure 3:
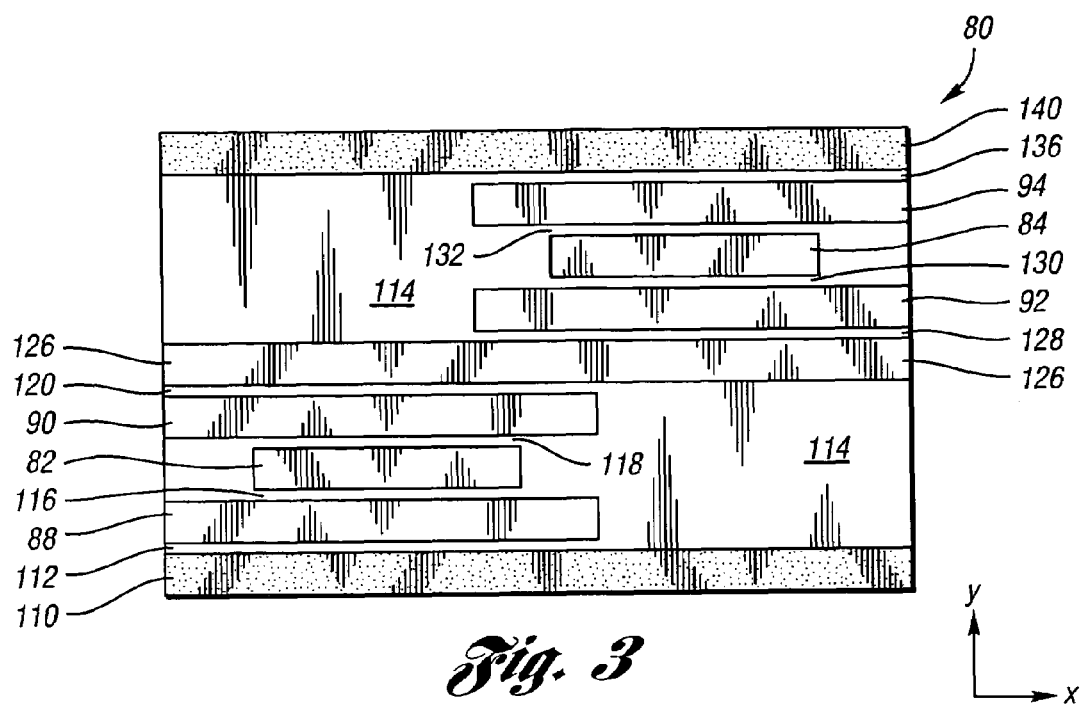
FIG. 3 illustrates a top-view diagram of a separate-shield read element in accordance with one aspect of the present invention.
Figure 4:
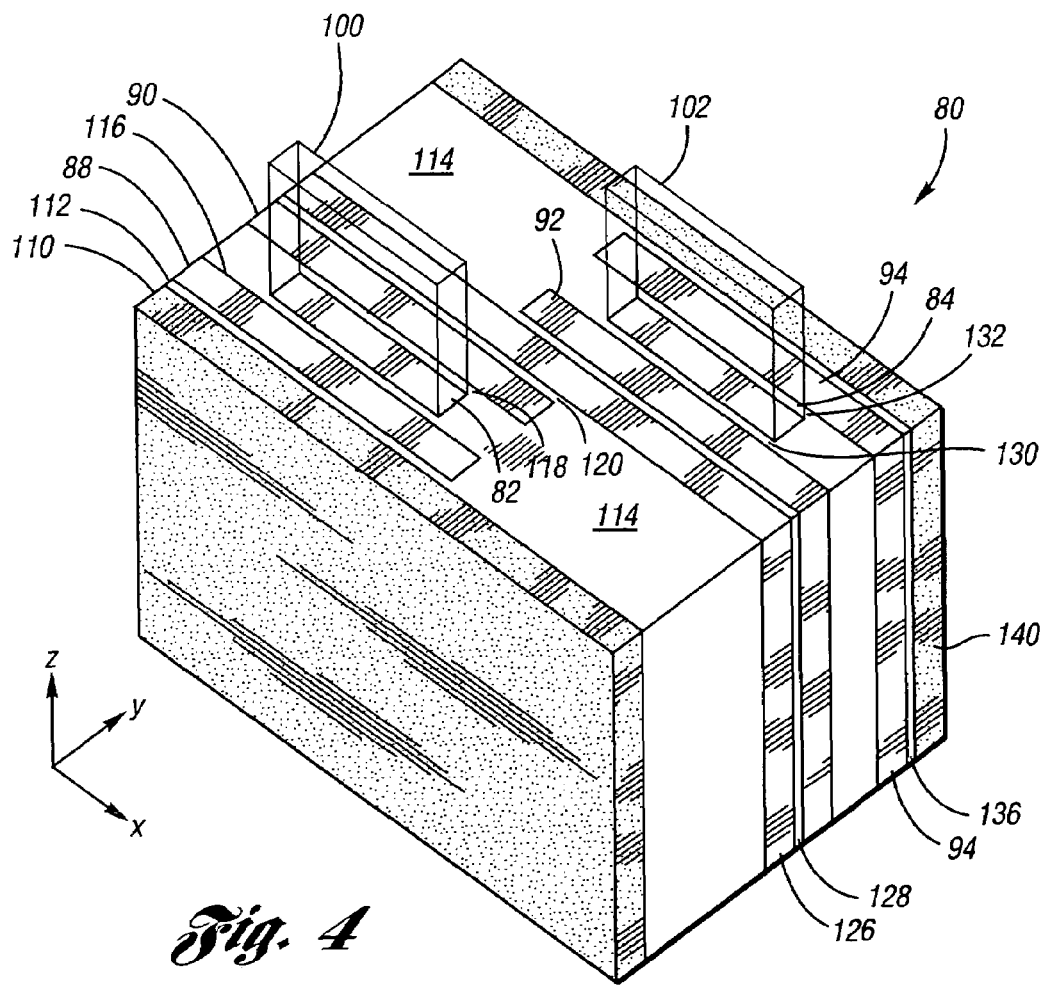
FIG. 4 illustrates a perspective view diagram of the separate-shield read element in accordance with one aspect of the present invention.

FIGS. 3 and 4 illustrate a diagram of a separate-shield read element 80 in accordance with one aspect of the present invention. The read element 80 includes a first read sensor 82 and a second read sensor 84. The read sensors 82-84 are preferably thin-filmed elements, such as a Magnetoresistive transducer of 1-10 microns (μ) that uses Anisotropic Magnetoresistance (AMR), Giant Magnetoresistance (GMR), or Tunneling Magnetoresistance (TMR) to convert magnetic information on the tape or disc to electrical signals. Of course, the present invention is not limited to these materials and contemplates the use of other materials that produce or provide the same or similar functions for reading data from a tape or disc.

A first shield 88, a second shield 90, a third shield 92, and a fourth shield 94 are positioned relative to the first read sensor 82 and the second read sensor 84 to define a first window 100 for the first read sensor 82 and a second window 102 for the second read sensor 84 through which the read sensors 82-84 receive magnetic signals from the tape 18 for reading the data bits stored thereon. The shields 88-94 are layers of magnetic material having high magnetic permeability so that undesired magnetic fluxes, such as from adjacent data elements, mainly flow to the shields 88-94 and not to the read sensors 82-84. This is advantageous to enhancing the precision of the window 100-102 for each read sensor whereby the precisely defined window permits the data bits on the tape or disc to be positioned closely to each other to maximize data density.

The read element 80 preferably comprises a number layers built upon each other to form a single chip structure that includes both the first read sensor 80 and the second read sensor 82. To build such a unitary structure, a first layer 110, or substrate layer, is initially created by pouring a ceramic or other material into a mold or other shape defining element. A first portion 112 of an insulating layer 114 is applied thereto, such as by vacuum deposition, for example by sputtering, of aluminum oxide or other insulating material, to electrically isolate the first layer 110. The first shield 88 is then applied and covered by a second application of the insulating material to form a second portion 116 of the insulating layer for covering the first shield 88. The first read sensor 82 is then applied and covered by a third application of the insulating material to form a third portion 118 of the insulating layer for covering the first read sensor 82. Preferably, the third application of the insulating material encapsulates electrical leads or wires that connect to the first read sensor. A fourth application of the insulating material is applied to the second shield 90 to form a fourth portion 120 of the insulating layer 114. A planarization layer 126 is applied to the fourth portion of the insulating layer 114. The planarization layer 126 is an aluminum oxide used to provide a flat, level surface upon which additional layers of the read element 80 are formed. The use of the planarization layer 126 in this manner is advantageous to enhance the precision at which the first and second read sensors 80-82 are positioned with respect to each other. A fifth portion 128 of the insulating layer 114 is applied to the planarization layer 126 to electrically isolate the planarization layer 126 and the third shield 92 is applied thereto and covered by a sixth application of the insulating material to form a sixth portion 130 of the insulating layer 114 for covering the third shield 92. The second read sensor 82 is then applied and covered by a seventh application of the insulating material to form a seventh portion 132 of the insulating layer for covering the second read sensor 82. An eight application of the insulating material is applied to the fourth shield 94 to form an eighth portion 136 of the second insulating layer upon which is applied a second layer 140, or closure. The construction of the read element 80 in this manner permits each layer to built upon a preceding layer on a singular chip structure, thereby maximizing the precision at which the first read sensor 80 is positioned relative to the second read sensor 82.

The second read sensor 82 is offset in an X and Y direction relative to the first read sensor 80 so that the first window and the second window cover different areas of the tape 18. By covering the different areas, the tape head 14 can be positioned by the controller 42 so that either one of the first read sensor 80 or the second read sensor 82 is aligned with the data tracks 46-52 on the tape 18. Should the tape alignment change, the controller 42 can move the tape head 14 depending on which of the first read sensor 80 or the second read sensor 82 is closer to being properly aligned with the moved tape 18, thereby reducing an amount of travel of the tape head 14.

Figure 5:
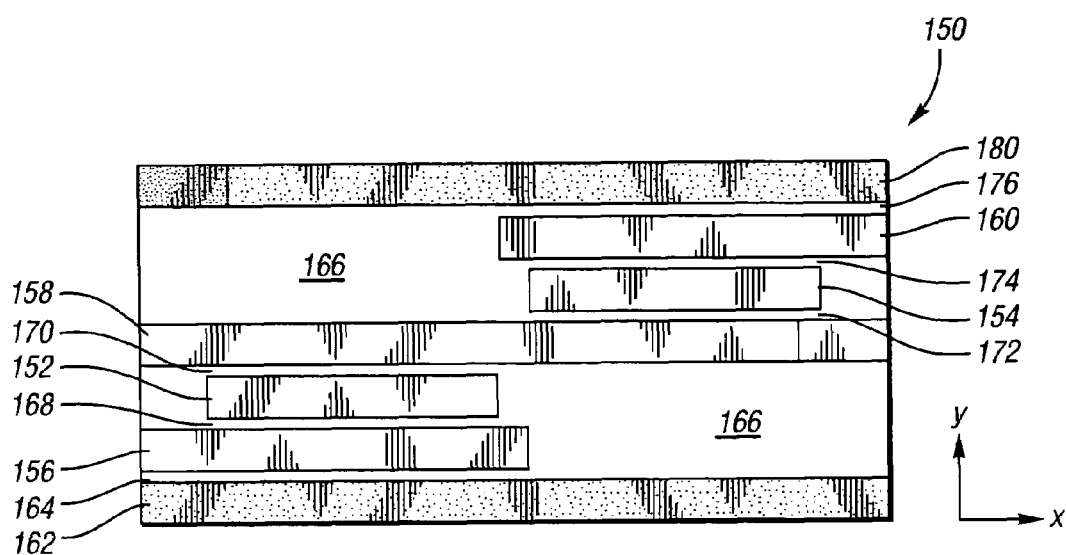
FIG. 5 illustrates a top-view diagram of a shared-shield read element in accordance with one aspect of the present invention.
Figure 6:
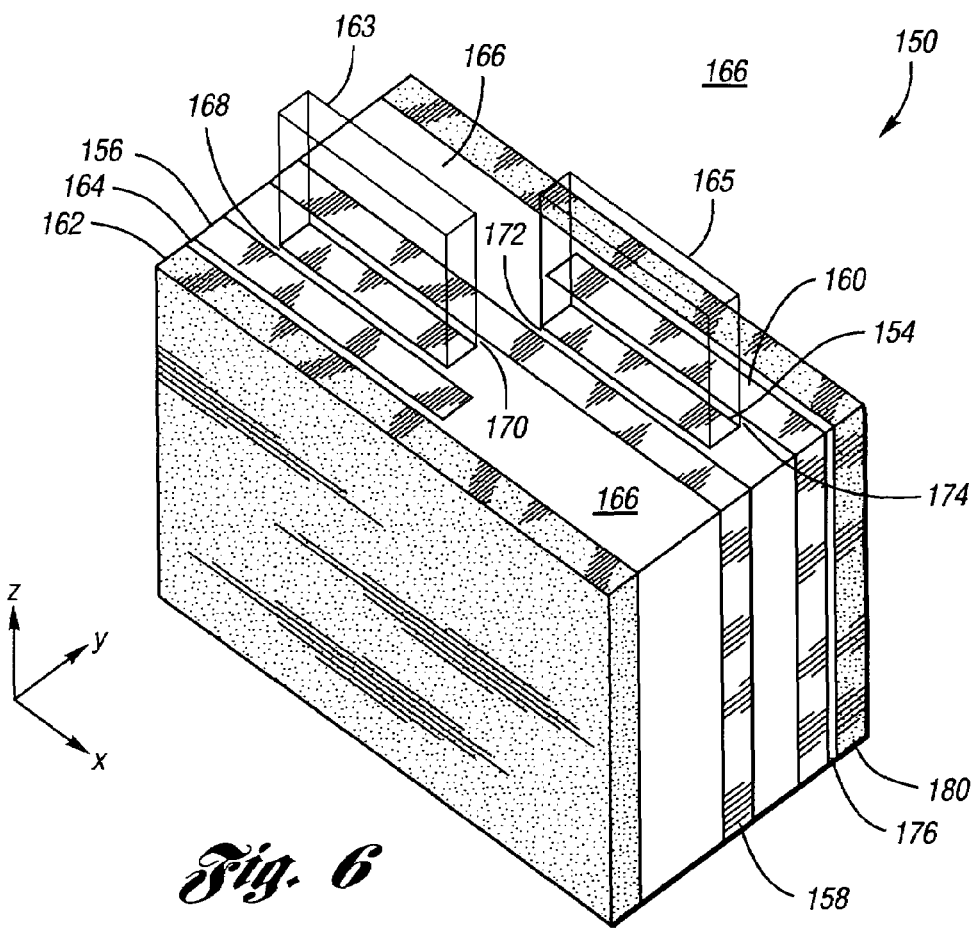
FIG. 6 illustrates a perspective view diagram of the shared-shield read element in accordance with one aspect of the present invention.

FIGS. 5 and 6 illustrate a diagram of a shared-shield read element in accordance with one aspect of the present invention. The read element 150 includes a first read sensor 152 and a second read sensor 154. The read sensors 152-154 are preferably thin-filmed elements, such as a Magnetoresistive transducer of 1-10 microns (μ) that uses Anisotropic Magnetoresistance (AMR), Giant Magnetoresistance (GMR), or Tunneling Magnetoresistance (TMR) to convert magnetic information on the tape or disc to electrical signals. Of course, the present invention is not limited to these materials and contemplates the use of other material that produce or provide the same or similar functions for reading data from a tape or disc.

A first shield 156, a shared-shield 158, and a second shield 160 are positioned relative to the first read sensor 152 and the second read sensor 154 to define a first window 163 for the first read sensor 152 and a second window 165 for the second read sensor 154 through which the read sensors 152-154 receive magnetic signals from the tape 18 for reading the data bits stored thereon. The shields 156-160 are layers of magnetic material having high magnetic permeability so that undesired magnetic fluxes, such as from adjacent data elements, mainly flow to the shields 156-160 and not to the read sensors 152-154. This is advantageous to enhancing the precision of the window 164-166 for each read sensor 152-154 whereby the precisely defined window permits the data bits on the tape or disc to be positioned closely to each other to maximize data density.

The read element 150 preferably comprises a number layers built upon each other to form a single chip structure that includes both the first read sensor 152 and the second read sensor 154. To built such a unitary structure, a first layer 162, or substrate layer, is initially created by pouring a ceramic or other material into a mold or other shape defining element. A first portion 164 of an insulating layer 166 is applied thereto, such as by vacuum deposition, for example by sputtering, of aluminum oxide or other insulating material, to electrically isolate the first layer, commonly referred to as an alumina spacer. The first shield 156 is then applied and covered by a second application of the insulating material to form a second portion 168 of the insulating layer 166 for covering the first shield 156. The first read sensor 152 is then applied and covered by a third application of the insulating material to form a third portion 170 of the insulating layer 166 for covering the first read sensor 152. Preferably, the third application of the insulating material encapsulates electrical leads or wires that connect to the first read sensor 152. A fourth application of the insulating material is applied to the shared-shield 158 to form a fourth portion 172 of the insulating layer 166. The second read sensor 154 is then applied and covered by a fifth application of the insulating material to form a fifth portion 174 of the insulating layer 166. The second shield 160 is then applied and covered with a sixth application of the insulating material to form a sixth portion 176 of the insulating layer 166. A second layer 180, or closure, of ceramic material is positioned on the portion 176 to define a length of the read element 150. The construction of the read element in this manner permits each layer to built upon a preceding layer on a singular chip structure, thereby maximizing the precision at which the first read sensor is positioned relative to the second read sensor.

The second read sensor 154 is offset in an X and Y direction relative to the first read sensor 152 so that the first window 163 and the second window cover 165 different areas of the tape 18. By covering the different areas, the tape head 14 can be positioned by the controller so that either one of the first read sensor 152 or the second read sensor 154 is aligned with the data tracks 46-52 on the tape 18. Should the tape alignment change, the controller 42 can move the tape head 14 depending on which of the first read sensor 152 or the second read sensor 154 is closer to being properly aligned with the moved tape, thereby reducing an amount of travel of the tape head.

The shared-shield 158 eliminates the second shield 90, the planarization layer 126, and the third shield 92 of the separate shield element 80 shown in FIGS. 3 and 4. This reduces a length of the read element in the Y direction, reduces an accumulating of tolerances during head fabrication by eliminating a need for additional layers between the first and second read sensors 152-154, reduces a total number of process steps in head fabrication by eliminating a planarization step, reduces a number of shield deposition and process steps, and reduces a number of chemical mechanized polished (CMP) steps.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A thin-film read element for use in reading magnetic signals from a device, the read element comprising:
 a first thin-film read sensor and a second thin-film read sensor, each read sensor converting the magnetic signal to electrical signals;
 wherein the read sensors are formed on a single chip structure; and
 wherein each layer of the single chip structure is parallel to the other layers.

2. The read element of claim 1 wherein the single chip structure includes a first shield layer and a second shield layer on opposite sides of the first read sensor and a third shield layer and a fourth shield layer on opposite sides of the second read sensor, the first and second shield layers defining at least a portion of a first window for the first read sensor and the third and fourth shields layers defining at least a portion of a second window of the second read sensor, the read sensors receiving the magnetic signals through the windows.

3. The read element of claim 2 wherein the single chip structure includes a planarization layer between the second shield layer and the third shield layer, the planarization layer providing a level surface for positioning the second read sensor relative to the first read sensor.

4. The read element of claim 3 wherein the single chip structure includes an insulator deposited between each of the layers, the read sensors, and the planarization layer for electrical isolation.

5. The read element of claim 4 wherein the single chip structure includes a first ceramic layer and a second ceramic layer at opposite ends of the chip structure to define a length of the structure.

6. The read element of claim 1 wherein the second read sensor is offset from the first read sensor.

7. The read element of claim 6 wherein the second read sensor is offset in a X and Y direction relative to the first read sensor.

8. A thin-film read element for use in reading magnetic signals from a device, the read element comprising:
 a first thin-film read sensor and a second thin-film read sensor, each read sensor converting the magnetic signal to electrical signals;
 wherein the read sensors are formed on a single chip structure; and
 wherein the single chip structure includes a first shield and a second shield on opposite sides of the first read sensor and a third shield and a fourth shield on opposite sides of the second read sensor, the first and second shield defining at least a portion of a first window for the first read sensor and the third and fourth shields defining at least a portion of a second window of the second read sensor, the read sensors receiving the magnetic signals through the windows.

9. The read element of claim 8 wherein the single chip structure includes a planarization layer between the second shield and the third shield, the planarization layer providing a level surface for positioning the second read sensor relative to the first read sensor.

10. The read element of claim 9 wherein the single chip structure includes an insulator deposited between each of the shields, the read sensors, and the planarization layer for electrical isolation.

11. The read element of claim 10 wherein the single chip structure includes a first ceramic layer and a second ceramic layer at opposite ends of the chip structure to define a length of the structure.

12. A thin-film read element for use in reading magnetic signals from a device, the read element comprising:
 a first thin-film read sensor and a second thin-film read sensor, each read sensor converting the magnetic signal to electrical signals;
 wherein the read sensors are formed on a single chip structure; and
 wherein the second read sensor is offset from the first read sensor.

13. The read element of claim 12 wherein the second read sensor is offset in a X and Y direction relative to the first read sensor.

* * * * *